(12) United States Patent
Virtanen

(10) Patent No.: US 7,982,473 B2
(45) Date of Patent: Jul. 19, 2011

(54) POSITION DETECTOR

(75) Inventor: Ari Virtanen, Lempäälä (FI)

(73) Assignee: Intellectual Ventures Holding 9 LLC, Carson City, NV (US)

( * ) Notice: Subject to any disclaimer, the term of this patent is extended or adjusted under 35 U.S.C. 154(b) by 431 days.

(21) Appl. No.: 11/883,336

(22) PCT Filed: Jan. 25, 2006

(86) PCT No.: PCT/FI2006/050040
§ 371 (c)(1),
(2), (4) Date: Feb. 24, 2009

(87) PCT Pub. No.: WO2006/079690
PCT Pub. Date: Aug. 3, 2006

(65) Prior Publication Data
US 2009/0174390 A1    Jul. 9, 2009

(30) Foreign Application Priority Data
Jan. 28, 2005   (FI) .................................... 20055042

(51) Int. Cl.
*G01R 27/08*   (2006.01)
*G01R 31/02*   (2006.01)

(52) U.S. Cl. ........ 324/699; 324/71.1; 324/714; 324/723

(58) Field of Classification Search .................. None
See application file for complete search history.

(56) References Cited

U.S. PATENT DOCUMENTS

| | | | |
|---|---|---|---|
| 4,920,939 A * | 5/1990 | Gale | 123/399 |
| 5,079,500 A * | 1/1992 | Oswald | 323/364 |
| 5,250,908 A | 10/1993 | Liu et al. | |
| 6,034,531 A | 3/2000 | Senglat et al. | |
| 6,184,695 B1 | 2/2001 | Gläser et al. | |
| 6,405,184 B1 | 6/2002 | Böhme et al. | |

FOREIGN PATENT DOCUMENTS

| | | |
|---|---|---|
| DE | 4322472 A1 | 1/1995 |
| DE | 19738050 A1 | 3/1999 |
| DE | 10006958 A1 | 8/2001 |
| FR | 2735871 A1 | 12/1996 |

OTHER PUBLICATIONS

PCT/ISA/210—International Search Report—Apr. 10, 2006.

* cited by examiner

*Primary Examiner* — Ha Tran T Nguyen
*Assistant Examiner* — Emily Y Chan
(74) *Attorney, Agent, or Firm* — McDonnell Boehnen Hulbert & Berghoff LLP

(57) ABSTRACT

A method for diagnosing a position detector used in determining the position of a control means. The position detector includes a resistance track, and a first terminal in connection with its first end, and a second terminal in connection with second end of the resistance track, and a slide electrically connected to the resistance track. The slide is arranged to move in relation to the control by the effect of a position change. Additionally, the position detector includes a slide terminal in connection with the slide, an electricity supply, a voltage measurer and a signal processing unit for diagnosing measurement data. In the method, a supply voltage is arranged in the slide terminal, the output voltage of the first terminal is measured, the output voltage of the second terminal is measured, and at least a first and a second output voltage are arranged to the signal processing unit.

9 Claims, 4 Drawing Sheets

POSITION DETECTOR

CROSS-REFERENCE TO RELATED APPLICATIONS

This application claims priority to Finnish patent application 20055042 filed 28 Jan. 2005 and is the national phase under 35 U.S.C. §371 of PCT/FI2006/050040 filed 25 Jan. 2006.

FIELD OF THE INVENTION

The invention relates to a method for diagnosing a position detector. In addition, the invention relates to a position detector.

BACKGROUND OF THE INVENTION

Position sensors based on a potentiometer are generally used in forming the position data of structures and parts of various vehicles and working machines. Typically, turning the structure of a device turns the potentiometer, thus creating a change in the resistance of an adjustable resistor. A change in the resistance is interpreted as a change in the position of the structure, which in some applications leads to a certain function. For example, in a vehicle a change in the position of the gas pedal has an effect on the gasoline feed system.

In several uses it is very substantial that no malfunctions occur. Because of this, component securing is used in several applications. For example, the movement of a gas pedal can be measured by two or more sensors, in which case the damaging of one sensor does not necessarily lead into a malfunction.

Different solutions have also been developed for condition monitoring of individual potentiometers. One such solution is disclosed in patent publication U.S. Pat. No. 6,184,695, which discloses a diagnostic circuit for a potentiometric sensor. The main principle of the solution according to the publication is that an alternating voltage is supplied to the sliding contact of an adjustable resistor, by means of which the resistance of the sliding contact is determined. On the basis of the resistance value it is possible to monitor the condition of the adjustable resistor. The solution in question is, however, relatively complex and it only reveals the changes in the resistance of the adjustable resistor.

SUMMARY OF THE INVENTION

Now, a solution has been invented, which enables a versatile condition monitoring of a potentiometric sensor in a simple manner.

The basic idea of the invention is that the voltage supply of the adjustable resistor is connected to a slide and voltage is measured from both ends of the resistance track. The voltage of the ends changes according to the position of the slide, in which case the position data can be determined on the basis of the voltages of one or both ends. There are advantageously suitable resistances between the ends and ground plane (ground reference potential).

The solution according to the invention enables monitoring the cords of a potentiometer in such a manner that disconnections are detected.

Another embodiment of the invention enables monitoring the cords of a potentiometer in such a manner that short-circuited connections are detected.

An embodiment of the invention, in turn, enables supplying a potentiometer with an alternating voltage without that substantially affecting the position data.

An embodiment of the invention enables measuring the contact resistance during normal operation and provides advance information on the wear of the potentiometer. This information can be used, for example, in anticipatory condition monitoring.

By using in some applications the structure according to an embodiment of the invention, the potentiometer does not necessarily have to be secured with several potentiometers, because even a damaged potentiometer can provide position data that is sufficient for several applications.

DESCRIPTION OF THE DRAWINGS

In the following, the invention will be described in more detail with reference to the appended principle drawings, in which.

For the sake of clarity, the figures only show the details necessary for understanding the invention. The structures and details that are not necessary for understanding the invention, but are obvious for anyone skilled in the art, have been omitted from the figures in order to emphasize the characteristics of the invention.

DETAILED DESCRIPTION OF THE INVENTION

Figure 1:
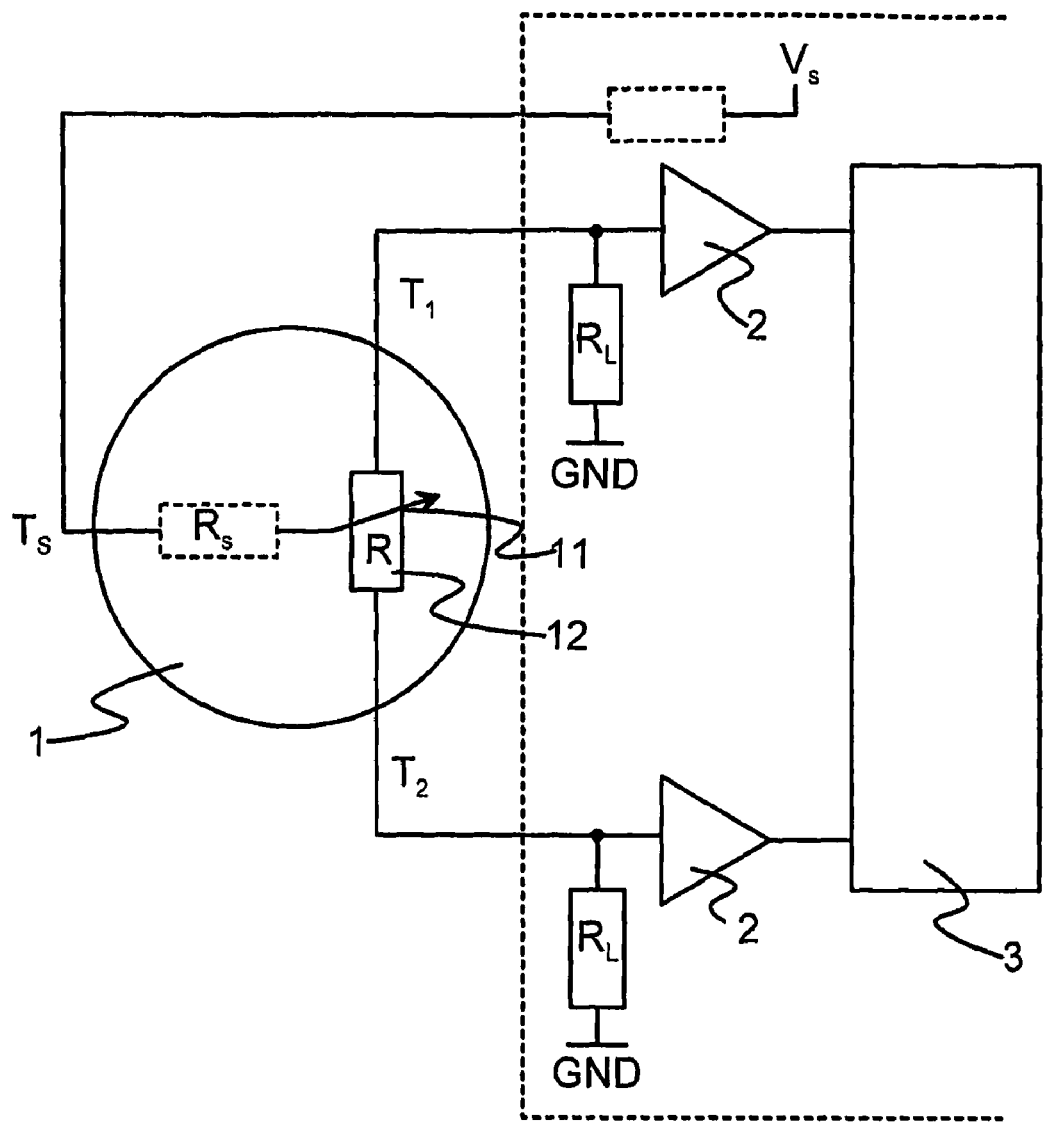
FIG. 1 shows a connection according to the invention.
Figure 2:
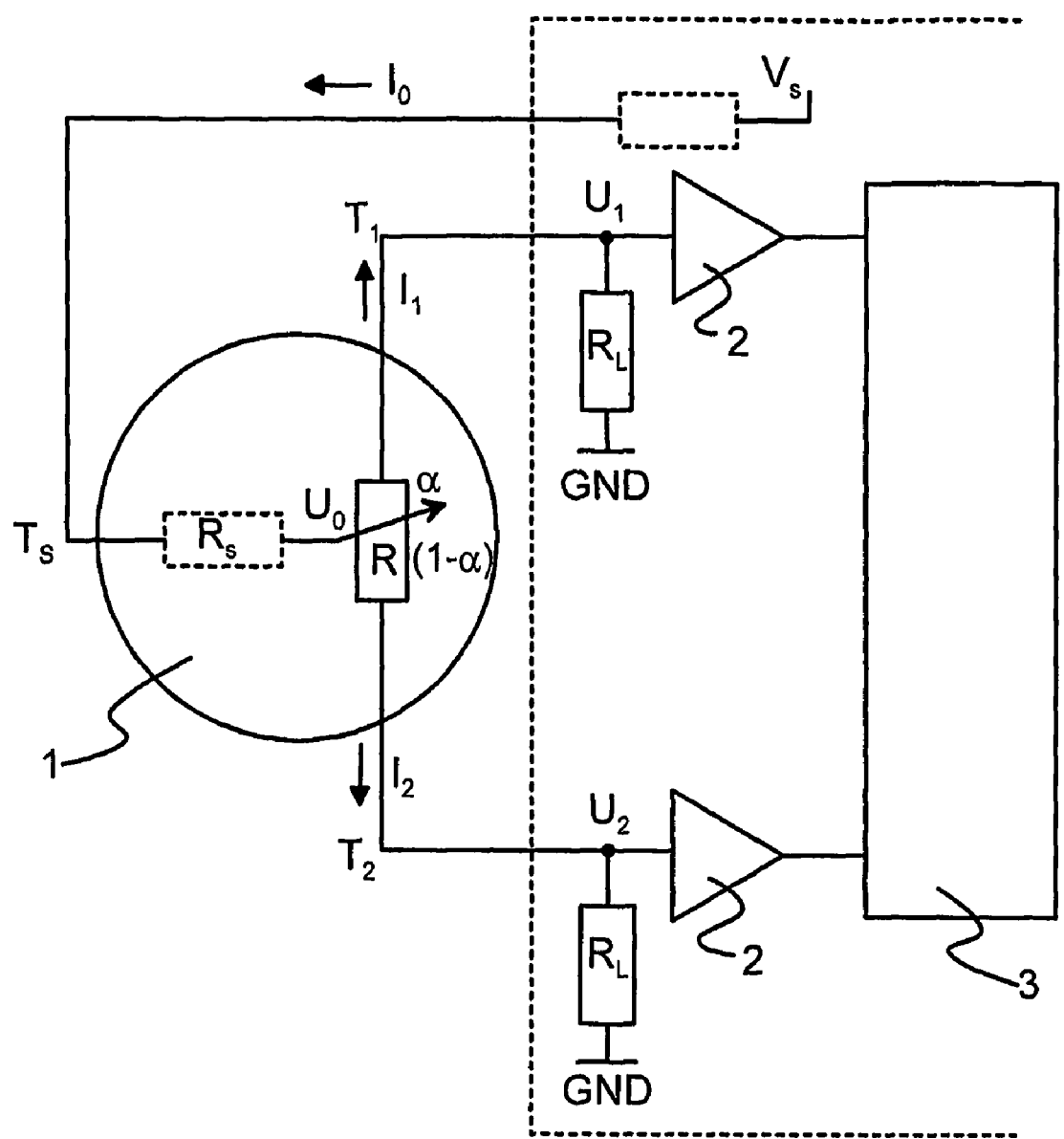
FIG. 2 shows a connection according to FIG. 1 supplemented with the symbols for voltages and currents.
Figure 3:
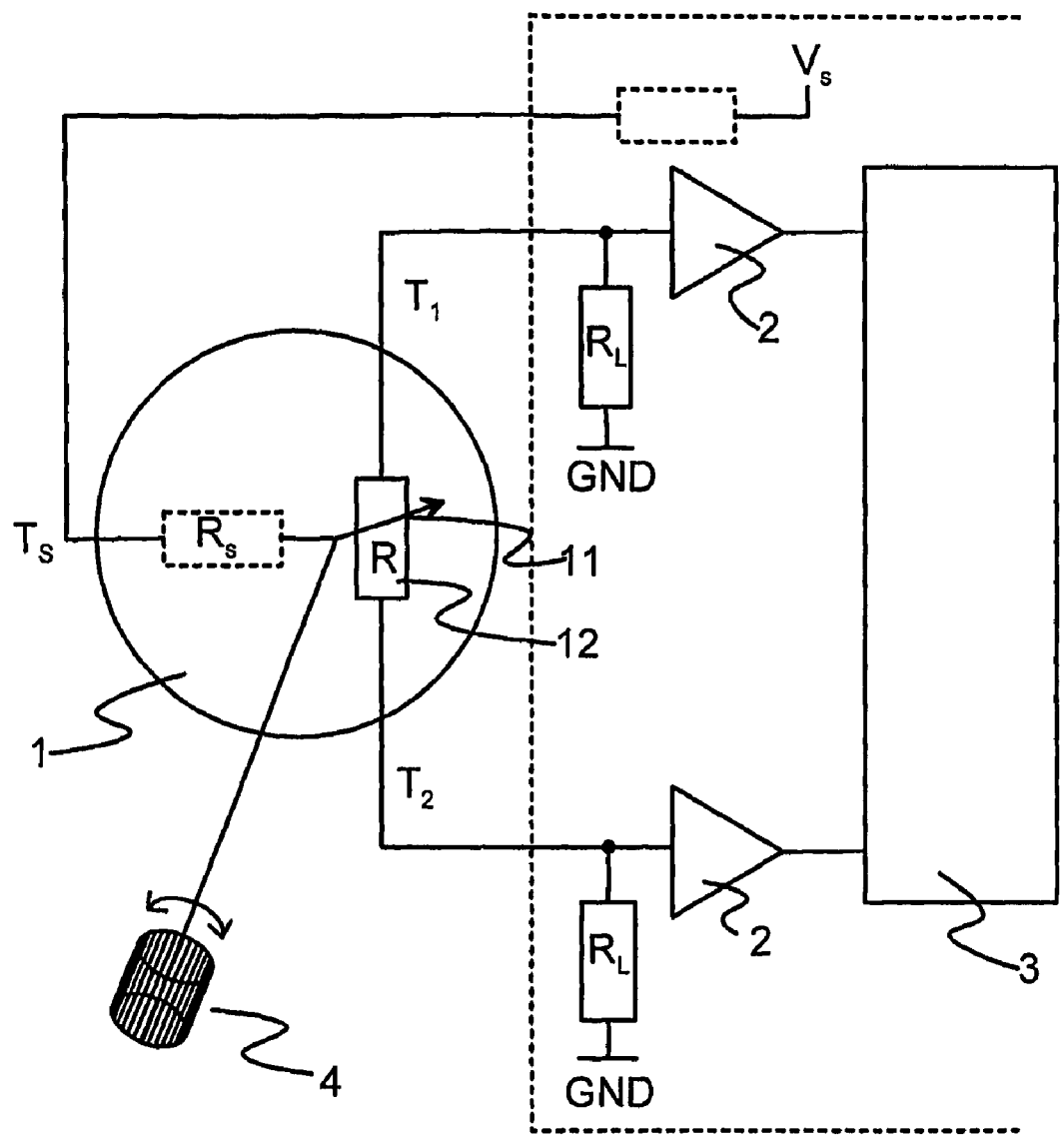
FIG. 3 shows a connection according to FIG. 1 supplemented with the principle structure of the control means.

FIG. 1 shows a connection according to the basic idea of the invention. In addition, FIG. 2 shows the symbols for currents and voltages, which are hereinafter used in connection with formulas. FIG. 3, in turn, shows an embodiment, wherein the control means 4 is arranged to control the adjustable resistor 1 and especially its sliding means 11.

The supply voltage $V_S$ of the adjustable resistor 1 is brought to the slide terminal $T_S$, i.e. the supply terminal, whose contact resistance is marked with reference $R_S$ in the figure. The slide terminal $T_S$ is via the sliding means, i.e. the slide 11 connected to a resistance track 12, whose resistance is marked with reference R in the figure. From the output terminals at the ends of the resistance track 12, i.e. from the first terminal $T_1$ and the second terminal $T_2$, are measured the output voltages $U_1$ and $U_2$. The voltages $U_1$, $U_2$ of the ends change according to the position of the slide 11, in which case the position data can be determined on the basis of the output voltages $U_1$, $U_2$ of one or both ends. There are advantageously suitable resistances $R_L$ between the ends and ground plane GND. The measurement of the output voltages $U_1$ and $U_2$ can be implemented in various ways and in the figures the measuring means is marked with reference 2. The measurement results are forwarded to a signal processing unit 3, which performs the necessary modifications on the measurement results and processes them in the desired manner. The signal processing unit 3 may, for example, perform the calculations presented hereinafter. In addition, the signal processing unit 3 may application-specifically perform other functions as well. In the example, only the information of the output voltages $U_1$, $U_2$ are shown to be coming to the signal processing unit 3, but naturally the signal processing unit may be in contact with more means in order to received different kinds of information and in order to forward the information further.

FIGS. 1, 2 and 3 show the possible series resistance in connection with voltage supply $V_S$ with dashed lines. The series resistance in question is not substantial from the point of view of the basic idea of the invention, but by using the series resistance it is possible, inter alia, to protect the device from malfunctions risks caused by a short circuit. Typically, a series resistance is used in various installations.

On the basis of the output voltages $U_1$, $U_2$ of the ends of the connection it is possible to determine direction data $\alpha$ of the slide 11, for example, in the manner described hereinafter. According to Kirchhoffs laws, the position data of the slide 11 can be determined according to the following formulas:

$$U_1 = \frac{R_L}{R_L + \alpha R} U_0 \qquad 1)$$

$$U_0 = I_2(1-\alpha)R + U_2 = \frac{U_2}{R_L}(1-\alpha)R + U_2 \qquad 2)$$

By placing $U_0$ according to formula 2 into formula 1, the value of the angle is:

$$\alpha = \frac{\frac{R_L}{R}(U_2 - U_1) + U_2}{U_1 + U_2} \qquad 3)$$

In one case the values of the output voltages $U_1$ and $U_2$ are $\frac{2}{3}$-$1 \times V_S$, when R=5 kΩ and $R_L$=10 kΩ. Thus, approximately only ⅓ of the area of the AND converter is in efficient use. It is, however, possible to set the reference voltage of the converter in such a manner that the area of the converter can be utilized better. Also, the magnitudes of R and $R_L$ can have an effect on the range of use. For example, when $R_L$=1 kΩ, the range of use is ⅐-$1 \times V_S$. Thus, however, the magnitude of the current traveling through the slide 11 increases.

Next, the contact resistance $R_S$ is solved. The formula 1 can also be presented in the form:

$$\alpha = \frac{U_0 R_L - U_1 R_L}{U_1 R} \qquad 4)$$

In addition, it is known that:

$$I_0 = I_1 + I_2 \qquad 5)$$

which formula can further be derived to the form:

$$U_0 = V_s - \frac{R_s}{R_L}U_1 - \frac{R_s}{R_L}U_2 \qquad 6)$$

By placing the $U_0$ according to formula 6 into formula 4, the following formula can be formed $$\alpha = \frac{(V_S - U_1)R_L - (U_1 + U_2)R_s}{U_1 R} \qquad 7)$$

If both $U_1$ and $U_2$ are acceptable, formulas 3 and 7 provide the same results. I.e.

$$\frac{\frac{R_L}{R}(U_2 - U_1) + U_2}{U_1 + U_2} = \frac{(V_S - U_1)R_L - (U_1 + U_2)R_s}{U_1 R}$$

From which $R_S$ can be solved either to the form $$R_s = \frac{V_s R_L(U_1 + U_2) - U_1 U_2(2R_L + R)}{(U_1 + U_2)^2} \qquad 8)$$

or $$R_s = \frac{V_S}{U_1 + U_2}R_L - \frac{U_1 U_2}{(U_1 + U_2)^2}(2R_L + R) \qquad 9)$$

depending on which of the previous forms is a better example, for example, from the point of view of data processing.

The solution according to the invention also enables monitoring the terminals $T_S$, $T_1$, $T_2$ and the cords of the potentiometer 1 in such a manner that disconnections are detected. By means of the connection according to the invention it is possible to detect such a damage connected to any connection terminal $T_S$, $T_1$, $T_2$ of the potentiometer, which would cause the connection terminal not to be able to substantially conduct electricity.

Figure 4:
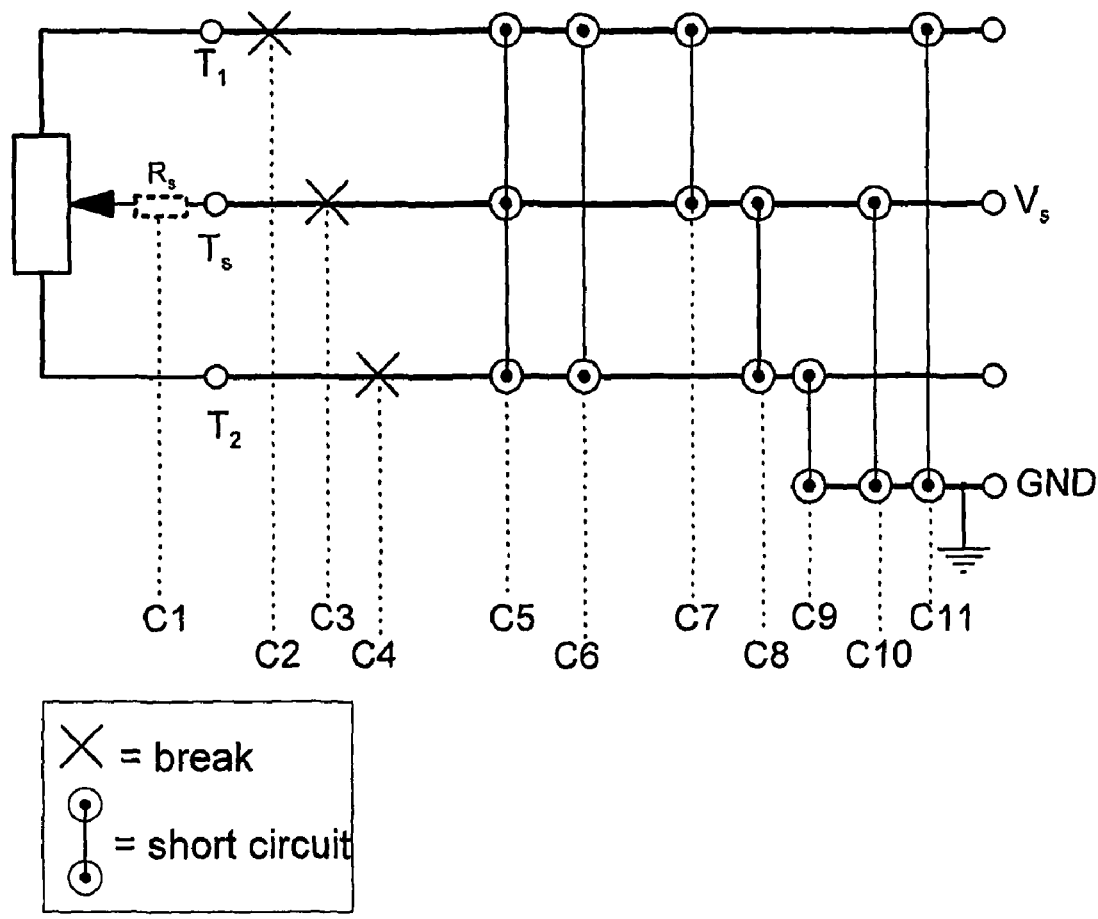
FIG. 4 shows some malfunctions that may occur in connecting with a potentiometer 1.

FIG. 4 shows some possible malfunction modes C1 to C11 that may occur in connecting a potentiometer 1. The malfunction modes C1 to C11 include, inter alia, resistance changes, breaks and short circuits, which may occurs, for example, in the connecting points of the potentiometer 1 and/or other connection connected to it and in cable portions. Table 1 shows a summary of short descriptions of the described malfunctions, the possibility of detecting malfunctions and the possibility of identifying malfunctions, as well as the status of the measuring accuracy of the potentiometer 1 during the malfunctions in question.

TABLE 1

Detecting and identifying some malfunction modes and the effect of malfunctions on the function

| Case | Description of malfunction | Detected | Identified | Measuring accuracy |
|---|---|---|---|---|
| C1 | Change in contact resistance | Yes | Yes | normal |
| C2 | Break in terminal $T_1$ | Yes | Yes | reduced |
| C3 | Break in terminal $T_S$ | Yes | No | not functioning |
| C4 | Break in terminal $T_2$ | Yes | Yes | reduced |
| C5 | Mutual short circuit of terminals | Yes | Yes | not functioning |
| C6 | Short circuit of terminals $T_1$ and $T_2$ | Yes | Yes | not functioning |
| C7 | Short circuit of terminals $T_1$ and $T_S$ | Yes | Yes | reduced |
| C8 | Short circuit of terminals $T_2$ and $T_S$ | Yes | Yes | reduced |

TABLE 1-continued

Detecting and identifying some malfunction modes
and the effect of malfunctions on the function

| Case | Description of malfunction | Detected | Identified | Measuring accuracy |
|------|---------------------------|----------|------------|--------------------|
| C9   | Short circuit of terminal $T_2$ to ground | Yes | Yes | reduced |
| C10  | Short circuit of terminal $T_S$ to ground | Yes | No  | not functioning |
| C11  | Short circuit of terminal $T_1$ to ground | Yes | Yes | reduced |

In malfunction mode C1 the contact resistance $R_S$ has changed. Thus, ranges of magnitudes of both the first output voltage $U_1$ and the second output voltage $U_2$ have changed. Since the changes in the voltage areas are similar, i.e. the area has either lowered or risen, the malfunction can be detected and identified. Since the direction data α is determined on the basis of the output voltages $U_1$ and $U_2$, the potentiometer 1 functions normally for the part of the direction data. The detection data of malfunction can be utilized in anticipatory condition monitoring, in which case the malfunction is repaired at a suitable moment. Typically when the slide 11 of the potentiometer 1 and/or the resistance track 12 wears, the value of the contact resistance $R_S$ rises and at the same time, there is notable variance in its value, on the basis of which a malfunction of the potentiometer 1 can be anticipated.

In malfunction mode C2, in turn, the first terminal $T_1$ is damaged, in which case the first output voltage $U_1$ goes substantially near the 0 volt of the ground plane (or near some other basic value of ground plane GND in use). Direction data α can thus, if necessary, be determined by means of only one output voltage $U_2$.

In malfunction mode C3 the connection terminal $T_S$ of the slide is damaged, in which case both $U_1$ and $U_2$ go substantially near the 0 volt (or near some other basic value in use). Thus, only the malfunction can be detected, but in malfunction mode C3 it is not possible to determine the type of the malfunction more specifically, nor the direction data α.

In malfunction mode C4, when the second terminal $T_2$ is damaged, the second output voltage $U_2$, in turn, goes substantially near the 0 volt (or near some other basic value of ground plane GND in use). Direction data α can thus, if necessary, be determined by means of only the first output voltage $U_1$.

An embodiment of the invention also enables monitoring the cords and connection terminals $T_S$, $T_1$, $T_2$ of the potentiometer 1 in such a manner that short circuited connections are detected. By means of the connection according to the invention it is possible to detect any short-circuit-type of damage C5 to C11 of a connection point $T_S$, $T_1$, $T_2$ of the potentiometer 1. For example, if all three connection terminals $T_S$, $T_1$, $T_2$ are in short circuited with the supply voltage $V_S$, i.e. malfunction mode C5, the output voltages $U_1$ and $U_2$ go substantially close to the supply voltage $V_S$. Thus, when changing the position of the slide 11, the values of the output voltages $U_1$ and $U_2$ do not change, and direction data α cannot be formed. Malfunction mode C5 can be detected and identified, but the formation of the direction data α is not successful.

Correspondingly, in malfunction mode C6 the terminals $T_1$ and $T_2$ are in short circuited, in which case when changing the position of the slide 11, the values of the output voltages $U_1$ and $U_2$ do not change, and direction data α cannot be formed. Also, malfunction mode C6 can be detected and identified, but the formation of the direction data α is not successful.

In malfunction mode C7, the first terminal $T_1$ is short circuited with the supply voltage $V_S$, in which case the first output voltage $U_1$ goes substantially close to the supply voltage $V_S$. Thus, when the position of the slide 11 is changed, the value of the first output voltage $U_1$ does not change, but the value of the second output voltage $U_2$ changes. Direction data α can thus, if necessary, be determined by means of only one output voltage $U_2$. I.e. malfunction mode C7 can be both detected and identified and the direction data α can be formed.

Correspondingly, when the second terminal $T_2$ is short circuited with the supply voltage $V_S$, i.e. malfunction mode C8, the value of the second output voltage $U_2$ goes substantially close to the supply voltage $V_S$. Thus, when the position of the slide 11 is changed, the value of the first output voltage $U_1$ changes, but the value of the second output voltage $U_2$ does not change. Direction data α can thus, if necessary, be determined by means of only the first output voltage $U_1$.

In malfunction mode C9, the terminal $T_2$ is short circuited with ground plane, in which case the second output voltage $U_2$ goes substantially near the 0 volt (or near some other basic value of ground plane GND in use). Thus, when the position of the slide 11 is changed, the value of the second output voltage $U_2$ does not change, but the value of the first output voltage $U_1$ changes. Direction data α can thus, if necessary, be determined by means of only the first output voltage $U_1$. I.e. malfunction mode C9 can be detected and identified, and the potentiometer 1 functions with a reduced resolution.

Correspondingly, in malfunction mode C11, the first terminal $T_1$ is, in turn, short circuited with ground plane, the first output voltage $U_1$ goes substantially near the 0 volt (or hear some other basic value of ground plane GND in use). Thus, when the position of the slide 11 is changed, the value of the first output voltage $U_1$ does not change, but the value of the second output voltage $U_2$ changes. Direction data α can thus, if necessary, be determined by means of only one output voltage $U_2$.

When the terminal $T_S$ of the slide 11 is short circuited with ground plane, i.e. malfunction mode C10, both the first output voltage $U_1$ and the second output voltage $U_2$ go substantially near the 0 volt (or near some other basic value of ground plane GND in use). Thus, the direction data α cannot be determined. Only the malfunction can be detected in malfunction mode C10, but not the more specific type of the malfunction.

As can be detected from the above-described examples, by means of the structure according to the invention, it is possible to detect short circuits and supply breaks. In, malfunction modes of the first or second terminal $T_1$, $T_2$, it is still possible to form direction data α, if it is necessary.

Detection data and identification data of malfunctions can be utilized in anticipatory condition monitoring. Thus, such malfunctions and wear that is likely to lead to malfunctions, which do not have an effect on the operation of the potentiometer, can be fixed at a suitable moment. For example, a potentiometer 1, whose wear is detected from changes in the contact resistance $R_S$ (malfunction mode C1) can be changed at a suitable time before it actually malfunctions. On the other hand, some of the malfunctions have an effect on the normal operation of the potentiometer 1, but enable the controlled finishing of the functions. These malfunction modes include, for example, C2, C4, C7, C8, C9 and C11.

By combining, in various ways, the modes and structures disclosed in connection with the different embodiments of the invention presented above, it is possible to produce various embodiments of the invention in accordance with the spirit of the invention. Therefore, the above-presented examples must not be interpreted as restrictive to the invention, but the embodiments of the invention may be freely varied within the scope of the inventive features presented in the claims hereinbelow.

The invention claimed is:

1. A method for diagnosing a position detector, which position detector is used in determining the position of a control means, which position detector comprises
    a resistance track having first and second ends,
    a first terminal in connection with the first end of the resistance track,
    a second terminal in connection with the second end of the resistance track,
    a slide means electrically connected to the resistance track, wherein the slide means is arranged to move in relation to the resistance track by effect of a change in the position of the control means,
    a slide terminal in connection with the slide means,
    an electricity supply,
    a voltage measuring means, and
    a signal processing unit for diagnosing measurement data,
the method comprising:
    receiving a supply voltage in the slide terminal;
    measuring a first output voltage of the first terminal;
    measuring a second output voltage of the second terminal; and
    providing at least the measured first output voltage and the measured second output voltage for the signal processing unit.

2. The method according to claim 1, wherein the position of the control means is determined on the basis of the measured first output voltage and the measured second output voltage measured.

3. The method according to claim 1, wherein at least a part of one or more malfunctions of the position detector are identified based on the measured first output voltage and the measured second output voltage.

4. The method according to claim 1, wherein a magnitude of a range of the measured first output voltage and the measured second output voltage is affected by resistances, which are placed between the first terminal and a ground plane and between the second terminal and the ground plane.

5. A position detector for determining a position of a control means, the position detector comprising:
    a resistance track having first and second ends;
    a first terminal in connection with the first end of the resistance track;
    a second terminal in connection with the second end of the resistance track;
    a slide means electrically connected to the resistance track, wherein the slide means is arranged to move in relation to the resistance track by effect of a change in the position of the control means;
    a slide terminal in connection with the slide means;
    an electricity supply;
    a voltage measuring means; and
    a signal processing unit for diagnosing the measurement data,
wherein
    a supply voltage is arranged to be supplied to the slide terminal
    the first terminal is connected to the voltage measuring means to measure the first output voltage,
    the second terminal is connected to the voltage measuring means to measure the second output voltage, and
    at least the measured first output voltage and the measured second output voltage are arranged for providing to the signal processing unit.

6. The position detector according to claim 5, wherein the signal processing unit is arranged to determine the position of the control means based on the measured first output voltage and the measured second output voltage.

7. The position detector according to claim 5, wherein the signal processing unit is arranged to identify at least a part of one or more malfunctions of the position detector based on the measured first output voltage and the measured second output voltage.

8. The position detector according to claim 5, further comprising a potentiometer, which comprises at least the resistance track and the slide means.

9. The method according to claim 5, wherein the position detector further comprises a ground plane and at least two resistances, which are placed between the first terminal and the ground plane and between the second terminal and the ground plane, in order to affect the range of the measured first output voltage and the measured second output voltage.

* * * * *

UNITED STATES PATENT AND TRADEMARK OFFICE
CERTIFICATE OF CORRECTION

| | | |
|---|---|---|
| PATENT NO. | : 7,982,473 B2 | |
| APPLICATION NO. | : 11/883336 | |
| DATED | : July 19, 2011 | |
| INVENTOR(S) | : Virtanen | |

It is certified that error appears in the above-identified patent and that said Letters Patent is hereby corrected as shown below:

Column 7, line 8, in Claim 1, delete "comprises" and insert -- comprises: --.

Column 7, line 9, in Claim 1, delete "track" and insert -- track, --.

Column 7, lines 33-34, in Claim 2, delete "voltage measured." and insert -- voltage. --.

Column 8, line 3, in Claim 5, delete "track" and insert -- track, --.

Column 8, line 14, in Claim 5, delete "diagnosing the measurement" and insert -- diagnosing measurement --.

Column 8, line 18, in Claim 5, delete "terminal" and insert -- terminal, --.

Signed and Sealed this
Twenty-eighth Day of February, 2012

David J. Kappos
*Director of the United States Patent and Trademark Office*